United States Patent [19]

Soriente

[11] 4,039,449
[45] Aug. 2, 1977

[54] FLOC BARRIER

[75] Inventor: Alfonse Joseph Soriente, Gillette, N.J.

[73] Assignee: Ecodyne Corporation, Lincolnshire, Ill.

[21] Appl. No.: 688,213

[22] Filed: May 20, 1976

[51] Int. Cl.² .............................................. B01D 21/10
[52] U.S. Cl. ................................................... 210/522
[58] Field of Search .................. 210/83, 513, 521, 522

[56] References Cited
U.S. PATENT DOCUMENTS 3,491,892  1/1970  McCann ................................. 210/521
3,852,199  12/1974  Wachsmuth et al. ................. 210/522
3,963,624  6/1976  Henderson et al. .................. 210/521

Primary Examiner—Bernard Nozick
Assistant Examiner—William A. Cuchlinski, Jr.
Attorney, Agent, or Firm—Charles M. Kaplan; Joel E. Siegel

[57] ABSTRACT

Apparatus in the shape of a parallelogram for separating solids from liquids consisting essentially of parallel tubes tilted toward one end of the parallelogram made by bonding square-tooth members extending across the width of the parallelogram to flat sheets that also extend across the width of the parallelogram.

8 Claims, 4 Drawing Figures

FLOC BARRIER

BACKGROUND OF THE INVENTION

This invention relates to liquid-solid separation equipment and more particularly to self-supporting modules of tubes for preventing discharge of solids from liquid treatment apparatus.

Many prior art tube modules are too expensive because of the complicated procedures and machinery required in their manufacture, or because of the large amount of material wasted. The components from which such modules are constructed vary in thickness and require alarge amount of storage space. The variation in thickness of the components of prior art modules causes weakened areas that reduce their reliability and durability.

SUMMARY OF THE INVENTION

Accordingly, it is an object of this invention to provide an improved multi-tube module for treating liquids.

Another object is to provide parallel-tube liquid treating equipment that is made from components of uniform thickness.

Another object is to provide a multi-tube module for treating liquids that essentially eliminates waste of material because some of its parts are made by calendering hot sheet plastic.

Another object is to provide a liquid-solid separation module that can be shipped disassembled at low freight rates, and then assembled at the site where it is used.

Another object is to provide a liquid-solid separation module that is made from easily assembled parts.

Another object is to provide a multi-tube liquid treatment device made from components that are easily nested and thus minimize the space needed for storage.

Another object is to provide modules of tubes or liquid treatment that are durable, strong, low-cost, and which do not possess defects found in similar prior art devices.

Still other objects and advantages of the invention will be revealed in the specification and claims, and the scope of the invention will be set forth in the claims.

DESCRIPTION OF A PREFERRED EMBODIMENT

Figure 1:
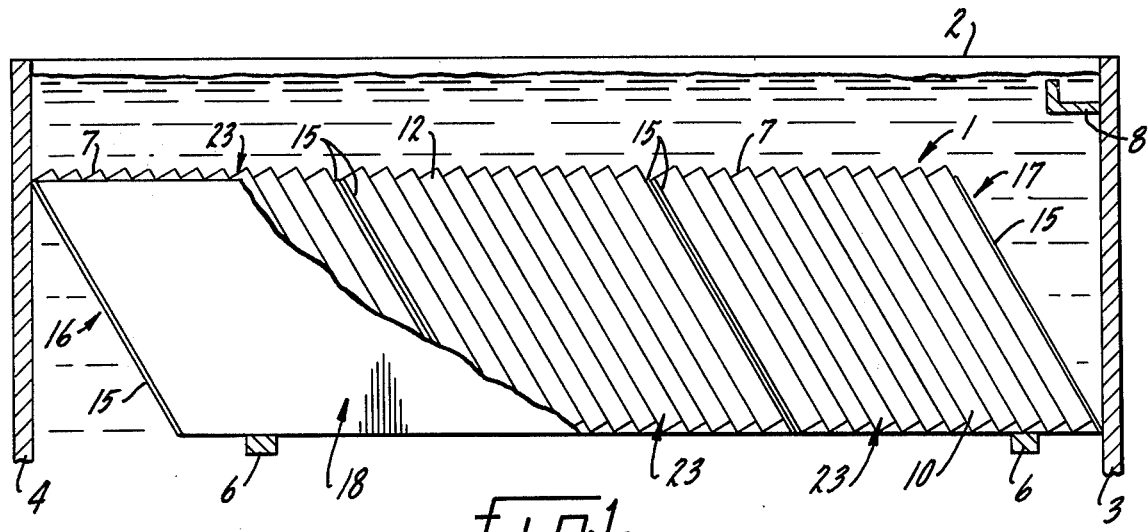
FIG. 1 is a partially broken-away side view of a preferred embodiment of the invention.
Figure 2:
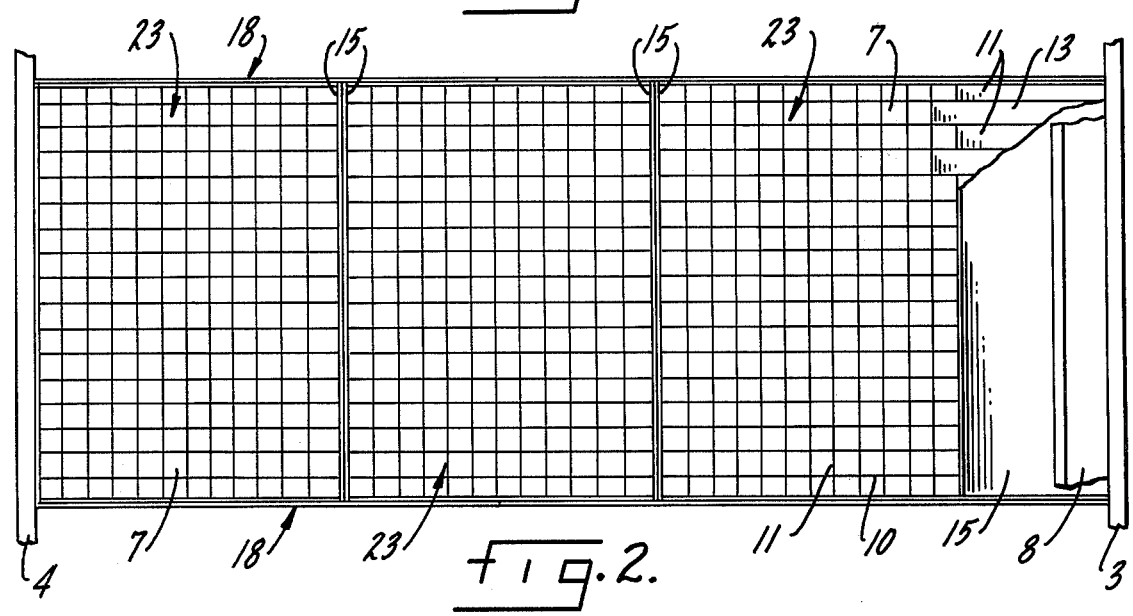
FIG. 2 is a partially broken-away top plan view of the invention.

FIGS. 1 and 2 show a multi-tube module 1 in the shape of a parallelogram for separating solids by sedimentation from the liquid in liquid treatment apparatus 2. Module 1 spans the walls 3 and 4 of apparatus 2 and may be suspended in the liquid in any convenient manner such as on beams 6. Module 1 is self-supporting in that it does not require any additional external means to hold its shape or to prevent collapse. Liquid in apparatus 2 flows upwardly through module 1 and solids in the liquid settle and slide down through tubes 7 in a well-known manner. Clarified liquid leaves apparatus 2 by flowing over effluent weir 8.

Module 1 is made from a plurality of integral square-tooth members 10 which extend across the width of the parallelogram. Each member 10 has a series of first segments 11 all lying in the same plane which extends across the width of the parallelogram. A pair of second segments 12 is connected to the opposite ends of each segment 11, and segments 12 extend lengthwise of the parallelogram. A series of third segments 13 all lie in the same plane parallel to the plane of first segments 11. Segments 12 connect the opposite ends of segments 13 to the ends of segments 11 in such a manner that the segments 11, 12 and 13 of each member 10 define three sides of the tubes 7 in a row of tubes extending across the width of the parallelogram. Segments 12 should be essentially perpendicular to segments 11 and 13, so that tubes 7 will be essentially rectangular. However, it may be advantageous for the included angle between segments 12 and segments 11 and 13 to be slightly greater than 90° (e.g. up to 92°) to facilitate nesting and separation of members 10 when they are stacked for storage or to facilitate separation of members 10 from the machinery in which they are manufactured.

Members 10 are separated from each other by, and bonded on both of their sides to, flat parallel sheets 15 which also extend across the width of the parallelogram. Sheets 15 are tilted at the same angle as members 10 toward one end of module 1, and define the fourth side of each tube 7. Sheets 15 define the opposite ends 16 and 17 of module 1.

Figure 5:
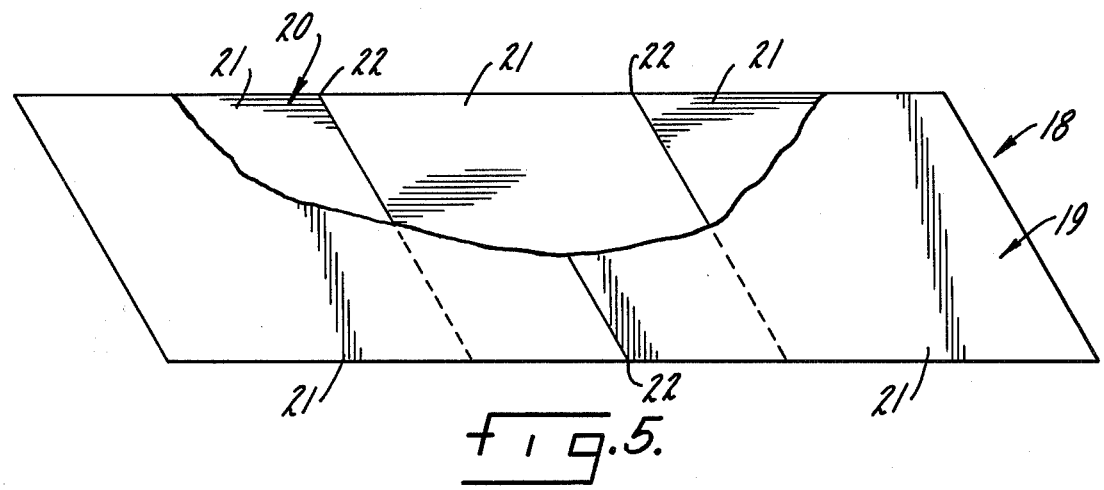
FIG. 5 is a partially broken-away side view of a side sheet from the embodiment of FIG. 1.
Figure 3:
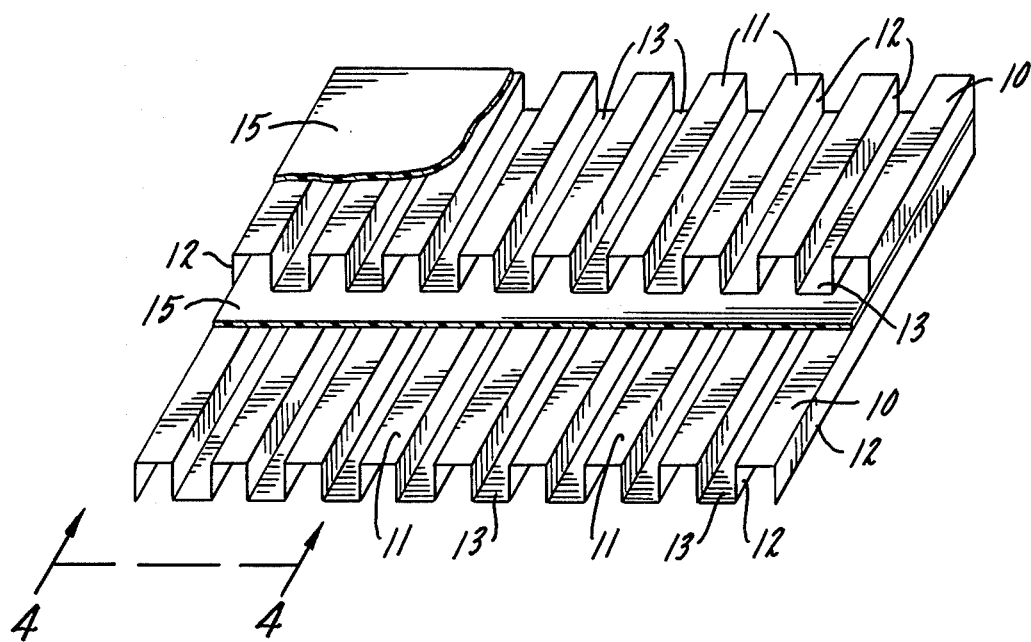
FIG. 3 is a perspective, partially-broken away enlarged view of components of the invention.
Figure 4:
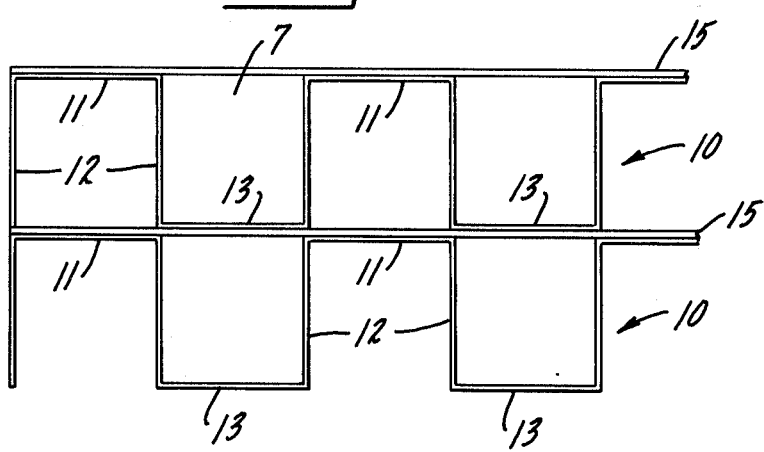
FIG. 4 is an end view taken along the line 4-4 in FIG. 3.

The opposite sides of module 1 are made from flat side sheets 18 which extend lengthwise of the parallelogram. Each sheet 18 is bonded to the edges of the members 10 and the tilted sheets 15 which terminate on its side of the parallelogram. The upper corners of tubes 7 may protrude above sheets 18, as shown in FIG. 1. To strengthen module 1, it is preferable that side sheets 18 be about twice as thick as members 10 and tilted sheets 15. Since it is economical to purchase and stock only one thickness of material for making all of the components of module 1, side sheets 18 may be made of bonding two layers 19 and 20 of such material in face to face contact with each other. Also, such material is not always available in lengths sufficient to cover module 1. It is therefore necessary to join a plurality of segments 21 in each layer 19 and 20. Segments 21 are end butted and bonded to each other at joints 22 along their edges. To further strengthen module 1, joints 22 should not overlap. This can be accomplished by having a different number of different sized segments 21 in each layer 19 and 20, as shown in FIG. 5.

It is usually necessary to use numerous modules 1 of different lengths to cover the flow path of the liquid leaving treatment apparatus 2. It is economical to fabricate such modules 1 of different lengths by joining several sub-assemblies 23 which have the same length. Sub-assemblies 23 are joined by bonding the endmost sheets 15 of the adjacent sub-assemblies to each other.

In a commercial embodiment of the invention used to remove solids from the liquid effluent from a clarifier, modules 1 32 inches wide were constructed in the shape of a parallelogram essentially as shown and described herein. Members 10 and tilted sheets 15 were made from rigid, sunlight and water resistant polyvinylchloride sheet stock 0.021 inches thick. Members 10 of uniform thickness were made by heating the sheet stock and passing it through calender rolls which formed the sawtooth shape shown and described herein; then pieces of proper length were cut and stacked by nesting until needed for bonding into sub-assemblies 23 that were twenty-four inches long. The tubes 7 were approximately two inches square in cross section, and were tilted at an angle of 60° to the horizontal. Side sheets 18 were built up from two 0.030 inch thick layers of the same type of sheet material which was segmented and joined with staggered seams as described herein. All components were solvent welded together in conventional manner. Approximately 0.10 gallons per minute of water flow through each tube 7 when the apparatus is operating at design capacity. The modules 1 of varying length are rigid, self-supporting structures capable of withstanding substantial, variable hydraulic forces and static loads when the liquid treatment apparatus is operating and when it is shut down for maintenance. For example, one such module twelve feet in length and supported only at its ends has supported two 200 pound men standing at its mid-point; this module was fabricated by joining six sub-assemblies 23 by solvent welding.

While the present invention has been described with reference to a particular embodiment, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. Apparatus for separating settlable solids from liquids comprising a self-supporting module in the shape of a parallelogram consisting essentially of a plurality of rows of parallel, vertical tubes tilted in the same direction toward one end of said parallelogram, each row of parallel tubes being defined by a square-tooth member extending across the width of said parallelogram, each square-tooth member having a series of first segments spaced across the width of said parallelogram in the same plane, a pair of second segments extending lengthwise of said parallelogram from the opposite ends of each of said first segments, a series of third segments, spaced across the width of said parallelogram in the same plane, the plane of said first segments being parallel to the plane of said third segments, said second segments also being connected to opposite ends of said third segments in such a manner that each of said first and third segments and the second segments connected to the opposite ends of each first and third segment define three sides of each said tubes, said square-tooth members being bonded to and separated by a pluarality of flat parallel sheets tilted toward said one end and extending across the width of said parallelogram, said tilted sheets defining the fourth side of each said tubes, a pair of flat side sheets extending lengthwise of said parallelogram at its opposite sides, and each of said side sheets being bonded to the oposite edges of said square-tooth members and said tilted sheets at said opposite sides of said parallelogram.

2. The invention defined in claim 1 wherein said first and third segments are essentially perpendicular to said second segments, so that said tubes are essentially rectangular.

3. The invention defined in claim 1 wherein said side sheets are at least twice as thick as said tilted flat sheets.

4. The invention defined in claim 1 wherein said side sheets comprise two overlapping layers of material having the same thickness bonded to each other.

5. The invention defined in claim 4 wherein each of said layers comprises a plurality of segments of material connected by bonded joints at their edges.

6. The invention defined in claim 5 wherein the segments in each of said overlapping layers have different lengths so that said joints will be staggered along the length of said parallelogram.

7. The invention defined in claim 1 wherein said module comprises a plurality of sub-assemblies of equal length with a flat sheet at the end of each sub-assembly bonded to a flat sheet at the end of an adjacent sub-assembly.

8. Apparatus for separating settlable solids from liquids comprising a self-supporting module in the shape of a parallelogram consisting essentially of a plurality of rows of parallel, vertical tubes tilted at an angle of about 60° in the same direction toward one end of said parallelogram, each row of parallel tubes being defined by a square-tooth member extending across the width of said parallelogram, each square-tooth member having a series of first segments spaced across the width of said parallelogram in the same plane, a pair of second segments extending lengthwise of said parallelogram from the opposite ends of each of said first segments, a series of third segments, spaced across the width of said parallelogram in the same plane, the plane of said first segments being parallel to the plane of said third segments, said second segments also being connected to opposite ends of said third segments in such a manner that each of said first and third segments and the second segments connected to the opposite ends of each first and third segment define three sides of each said tubes, said first and third segments being essentially perpendicular to said second segments so that said tubes are essentially rectangular, said square-tooth members being bonded to and separated by a plurality of flat parallel sheets tilted toward said one end and extending across the width of said parallelogram, said tilted sheets defining the fourth side of each said tubes, a pair of flat side sheets extending lengthwise of said parallelogram at its opposite sides, said side sheets being at least twice as thick as said tilted flat sheets and comprising two overlapping layers of material having the same thickness bonded to each other, each of said overlapping layers comprising a plurality of segments of material connected by bonded joints at their edges, the segments in each of said overlapping layers have different lengths so that said joints will be staggered along the length of said parallelogram, and each of said side sheets being bonded to the opposite edges of said square-tooth members and said tilted sheets at said opposite sides of said parallelogram.

* * * * *

UNITED STATES PATENT AND TRADEMARK OFFICE
CERTIFICATE OF CORRECTION

PATENT NO. : 4,039,449
DATED : August 2, 1977
INVENTOR(S) : Alfonse Joseph Soriente It is certified that error appears in the above-identified patent and that said Letters Patent are hereby corrected as shown below:

In column 1, line 14 delete "alarge" and insert --a large--

In column 1, line 38 delete "or" and insert --for--

In column 2, line 43 delete "made of" and insert --made by--

In column 2, line 63 delete "modules 1 32" and insert --modules 1-32--

Signed and Sealed this

Twenty-fifth Day of October 1977

[SEAL]

Attest:

RUTH C. MASON
Attesting Officer

LUTRELLE F. PARKER
Acting Commissioner of Patents and Trademarks